United States Patent [19]
Hawkins et al.

[11] Patent Number: 5,818,795
[45] Date of Patent: Oct. 6, 1998

[54] METHOD OF REDUCTION OF NOISE FROM SEISMIC DATA TRACES

[75] Inventors: Keith Hawkins, Grayshott; Simon Rice Barnes, Berkshire; Gregory Peter Gwyn Fookes, Woking, all of United Kingdom

[73] Assignee: PGS Tensor, Inc., Houston, Tex.

[21] Appl. No.: 741,313

[22] Filed: Oct. 30, 1996

[51] Int. Cl.⁶ .................................................. G01V 1/36
[52] U.S. Cl. .................. 367/21; 367/38; 367/47
[58] Field of Search .................. 367/21, 24, 38, 367/47

[56] References Cited

U.S. PATENT DOCUMENTS

| | | | |
|---|---|---|---|
| 2,733,412 | 1/1956 | Alexander et al. | 333/12 |
| 3,344,395 | 9/1967 | Silverman et al. | 367/46 |
| 3,611,279 | 10/1971 | Hensley, Jr. | 367/46 |
| 3,704,444 | 11/1972 | Schmitt | 367/46 |
| 4,203,161 | 5/1980 | Johnson et al. | 367/40 |
| 4,204,279 | 5/1980 | Parrack et al. | 367/40 |
| 4,210,968 | 7/1980 | Lindseth | 367/46 |
| 4,707,812 | 11/1987 | Martinez | 367/46 |
| 4,910,716 | 3/1990 | Kirlin et al. | 367/24 |
| 4,937,794 | 6/1990 | Marschall et al. | 367/21 |
| 5,182,729 | 1/1993 | Duren et al. | 367/38 |
| 5,237,538 | 8/1993 | Linville, Jr. et al. | 367/38 |
| 5,293,352 | 3/1994 | Chambers | 367/38 |
| 5,365,492 | 11/1994 | Dragoset, Jr. | 367/21 |
| 5,424,999 | 6/1995 | Manin | 367/21 |
| 5,555,530 | 9/1996 | Meehan | 367/45 |

FOREIGN PATENT DOCUMENTS 0-201-643 A   9/1985   European Pat. Off. .

OTHER PUBLICATIONS

Akbulut et al., "Suppression of Seismic Interference Noise on Gulf of Mexico Data", 17th Annu SPE of AIME et al Offshore Technology Conf., Proc. v 2, pp. 303–308.

"Automatic Surgical Blanking of Burst Noise in Marine Seismic Data", Berni, A.J.

*Primary Examiner*—Ian J. Lobo
*Attorney, Agent, or Firm*—Gordon T. Arnold

[57] ABSTRACT

A method of suppression of burst coherent noise in seismic data is provided comprising (a) comparing a threshold amplitude characteristic acceptance value for a time window of a reference trace to an amplitude characteristic of a test trace of a set of traces within the window and; (b) applying a non-zero scalar to the test trace in the time window if an amplitude of the test trace within the time window is not within the threshold amplitude characteristic acceptance value.

52 Claims, 2 Drawing Sheets

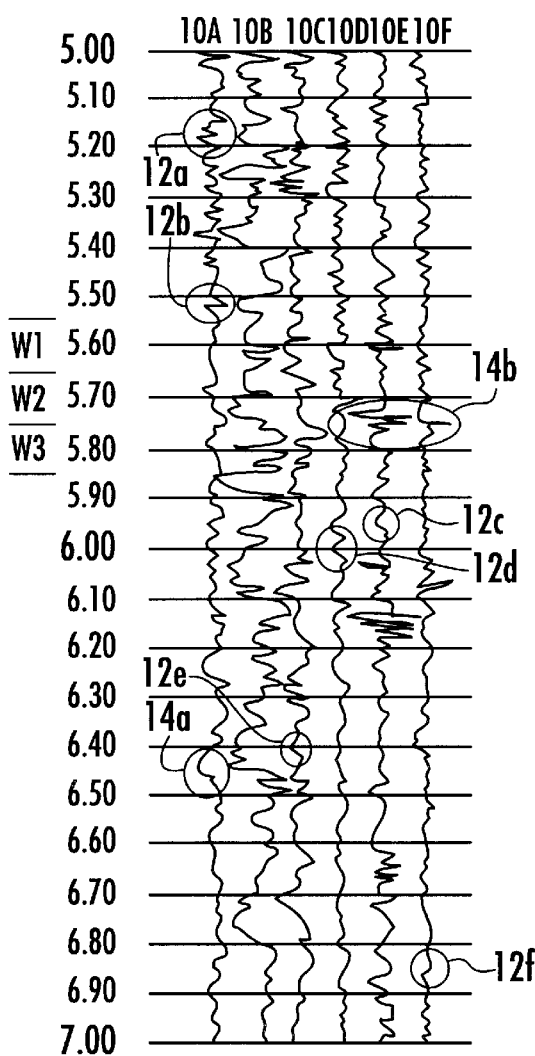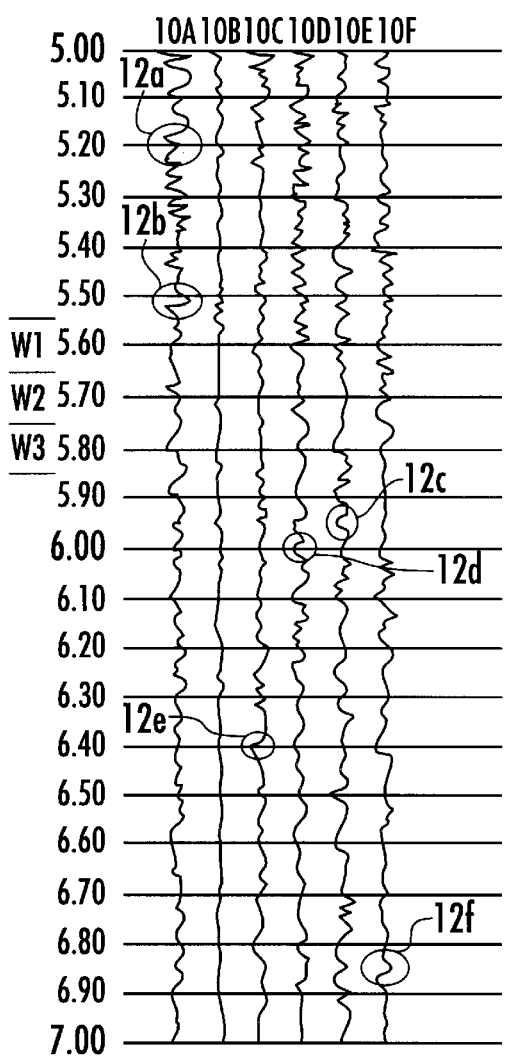

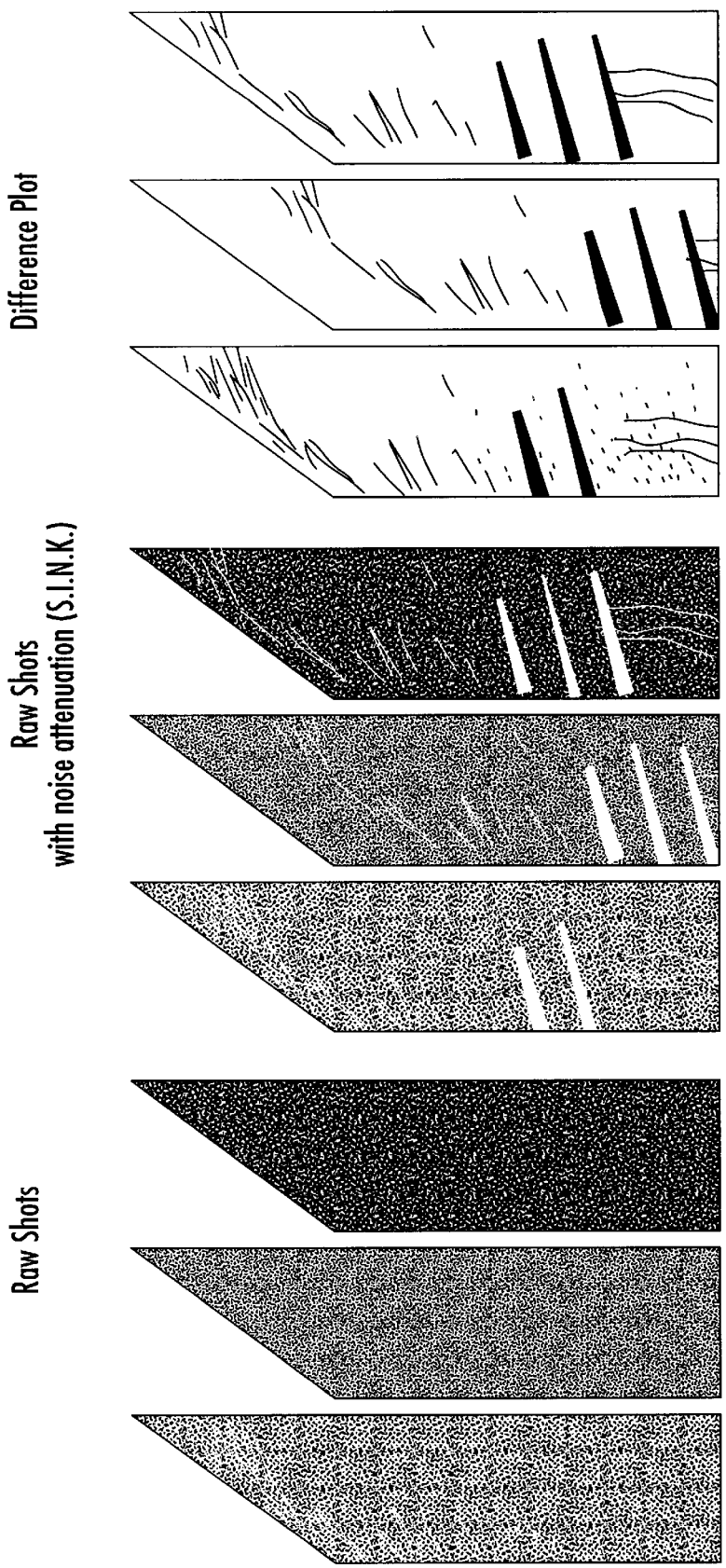

METHOD OF REDUCTION OF NOISE FROM SEISMIC DATA TRACES

BACKGROUND OF THE INVENTION

This invention relates to the field of reduction of noise from seismic traces, and more particularly to the reduction of "burst" noise in marine seismic data.

In some forms of acquisition of marine seismic data, streamers are towed behind vessels and include seismic signal receivers (for example, hydrophones). The signals received by the receivers are recorded on the vessel after transmission through wires in the streamer, as is commonly known in the art. The vessel also tows seismic signal sources (for example, air guns). During operation, the vessel travels along the survey line, periodically firing the source and recording reflections from the earth's strata at the receivers. In other forms, cables are placed on the ocean bottom and sources are towed along the survey line. In still other forms, multiple streamer and source boats are used. In any of these forms, the distance between the source and a particular receiver is called the "offset" for that source-receiver pair, and the record received at any particular receiver for any particular shot is known as a "trace."

As is also commonly known in the art, the survey process results in multiple reflections being received from the same reflector. Typically, those traces having common reflections are gathered into a common reflection gather, each trace of which has a different offset. Further processing of the traces within the common reflection gather is performed to eliminate error introduced by the different offsets (for example, NMO, and DMO, and other "migration" algorithms). The variety of processing done at this stage is quite large, and is well known to those of skill in the art. After this processing, the traces are added together (a.k.a. stacked), and the result is another trace. The first trace, representing the shot receiver pair, will be referred to herein as a "shot trace." The second trace, representing the stacked data, will be referred to herein as the "stacked trace."

Stacking is performed for the purpose of elimination of noise, following the theory that noise is often random, or it can be made to appear random. Signal is not. Accordingly, reflections from seismic data should add constructively, while noise in the shot traces, when stacked, should add destructively. For a great deal of noise, such a process works quite well. However, noise that occurs in bursts, especially noise that occurs in patterns, is not, necessarily, eliminated through the stacking process of common reflection gathers.

For example, such noise occurs when another survey vessel is near and firing an air gun in a periodic pattern. This seismic interference can travel a surprising distance, depending on the particular location, water depth, and water-bottom reflection coefficient. Especially when attempting to receive reflections from deep strata, interference from other seismic vessels is an acute problem. Currently, the industry has resorted to the very expensive and time-consuming method of "time-sharing," whereby only one vessel in a given area operates at a given time, even though many vessels could operate in the area together, were it not for interference from the respective vessels' sources.

Another source of burst noise is sometimes called "swell" noise. This noise is not well understood. However, it occurs as the seas increase. With some modern acquisition vessels, the swell noise becomes the limiting factor on the height of the seas in which the vessel can operate.

As seen above, there is a need to reduce the amount of burst noise in seismic data. In a recent industry study, proposed solutions to the problem included the desyncronisation of sources between any two vessels working in a given area. Also, it was noted that the most damaging noise occurs when sources are broadside. The tests for this particular industry study identified a "danger" segment from noise sources located in a segment from about 60 to about 120 degrees from in line that should be avoided.

Another suggestion for dealing with burst noise is included in "Automatic Surgical Blanking Of Burst Noise In Marine Seismic Data," by A. J. Berni, of Shell Development Company, S 8.2, which can be found in the following publication: SEG Annual Meeting Expanded Technical Program Abstracts With Biographies, 1987, incorporated herein by reference. As described in Berni's article, he attempts to "blank" interfering source noise. Berni notes that by sorting the data into common-offset distance panels, each trace in the common off-set panel is from a different shot. Therefore, the interference will appear burst-like, unless the two sources are synchronized. The lack of trace-to-trace continuity in the common-offset distance panel is advantageous, according to Berni, because it distinguishes the interference from all other signals in the data. Reflected, refracted, and diffracted energy from one's own source all show lateral continuity in the common-offset panel. Berni's approach is then to blank regions showing poor lateral continuity.

He suggests accomplishing this by dividing the panel into equal time gates of approximately 300 milliseconds duration. The single amplitude value is calculated for each gate on every trace. The average absolute amplitude of the data samples and the particular gate is Berni's preferred method, noting that RMS or sum of the squares measures are also suitable. Berni also represents each time gate by a single amplitude value to reduce computational load. The value for a given gate is then compared to others for the same offset distance, wherein one scans across the common-offset distance panel and detects amplitude values that are anomalous for that time gate. Gates with anomalous amplitude values are selected for "surgical" blanking.

Berni lists two methods for detecting anomalous amplitude values. One method consists of laterally smoothing the sequence of amplitude values for a time horizon on the common-offset panel to obtain a reference value. That value is compared to the reference value from nearby gates. The gate is blanked, or set to zero, if the ratio of a particular gate to reference amplitude exceeds some threshold, typically three or higher. Berni suggests that blanking should only be applied to high level noise bursts that cannot be overcome by stacking. He also suggests removing weak traces entirely, which he calls "misfires." The second method is the use of the median of nearby gate amplitudes to obtain the reference value. Typically, 15 gate amplitudes on each side of the candidate trace are used in a 31 point median calculation. Berni believes that a median-based reference calculation is tolerant of occasional erroneous amplitude fluctuations due to either misfires or random bit errors in the digitized samples.

Unfortunately, the process suggested by Berni removes too much seismic information in its blanking and trace removal. Further, it has been found that the process suggested by Berni, contrary to his assertions, eliminates actual reflections.

Other attempts to deal with noise are seen in various references. For example, in U.S. Pat. No. 5,555,530, issued Sept. 10, 1996 to Meehan on an application filed Dec. 6, 1993, and incorporated herein by reference, a method is disclosed for improving the signal to noise ratio from a pair of detectors, such as geophones, which each detect a noisy signal comprising a signal of interest (S) and a noise signal (N), wherein the signal of interest (S) has a different moveout across the pair of detectors from that of the noise signal (N), and the noise signal (N) from a given source is detected at the first detector at a time delta t before the corresponding noise signal is detected at the second detector. Meehan delays the noisy signal (S+N) detected at the first detector by an amount greater than the moveout of the signal of interest, but not more than delta t, and subtracts the delayed signal from that detected at the second detector by means of an adaptive filter, so as to minimize the power in the resultant signal.

In U.S. Pat. No. 5,424,999, issued to Manin on Jun. 13, 1995, incorporated herein by reference, a method for addressing one aspect of the burst noise problem is disclosed which requires highly accurate knowledge of each ship and source, in order to remove the bursts in later processing.

U.S. Pat. No. 5,293,352, issued to Chambers on Mar. 8, 1994 and incorporated herein by reference, discloses a method of sorting common shot gathers into common receiver gathers, migrating the wave field envelops from the common receiver gathers using one half the near-surface velocity to provide migrated data sets, and then resorting the migrated data sets into common shot gathers and subtracting the common shot gathers from the original raw common shot gathers to provide coherent-noise reduced data sets.

U.S. Pat. No. 5,237,538, issued to Linville, et al., Aug. 17, 1993, and incorporated herein by reference, addresses the removal of estimated coherent noise within a gated signal-plus noise.

U.S. Pat. No. 5,182,729, issued to Duren et al., Jan. 26, 1993, and incorporated herein by reference, discloses a seismic surveying and data processing method to filter from seismic data any energy contributions that are not in the seismic line of profile. The surveying method requires a receiver geometry wherein at least one receiver is in and at least one receiver is out of the line of profile, so that in common offset gather or shot record plots, seismic events along the line of profile are aligned in time, and out-of-plane energy takes the form of a series of saw-toothed seismic events arriving at different times in the different lines of receivers. Knowing the number of out-of-plane energies and their respective dips allows for the design of a filter, which is applied to the data with a computer, to null and thereby remove the effects of unwanted out-of-plane energy from the seismic survey data.

U.S. Pat. No. 4,937,794, issued to Marschall et al. on Jun. 26, 1990, and incorporated herein by reference, discloses a method for suppression of coherent noise on seismic records by reformatting the common shot gathers to common receiver gathers. Pairs of seismic traces from a common receiver gather are corrected for differential normal moveout, weighted in inverse relation to the RMS signal power, and combined to generate compressed common receiver gathers. The compressed common receiver gathers may be reformatted as common midpoint gathers for further processing.

Other earlier references found in a search of the area include the following, all of which are incorporated herein by reference: U.S. Pat. No. 4,910,716, issued to Kirlin et al. on Mar. 20, 1990, U.S. Pat. No. 4,707,812, issued to Martinez on Nov. 17, 1987, U.S. Pat. No. 3,704,444, issued to Schmitt on Nov. 28, 1972, U.S. Pat. No. 3,611,279, issued to Hensley on Oct. 5, 1971, U.S. Pat. No. 3,344,395, issued to Silverman et al Sep. 16, 1967, U.S. Pat. No. 2,733,412, issued Jan. 31, 1956 to Alexander et al., and U.S. Pat. No. 4,210,968, issued Jul. 1, 1980 to Lindseth.

In none of the above-references has a method been found to reduce coherent or burst noise in an efficient manner without elimination of the signal along with the noise. The industry continues to use the expensive time-sharing solution. Accordingly, there is a need for a method of dealing with burst noise which does not eliminate large amounts of actual reflection data, and which will reduce the need for the expensive process of time-sharing.

SUMMARY OF THE INVENTION

It is the object of the present invention to address the above-described problems. Therefore, according to one aspect of the invention, a method of reducing noise from a set of seismic data traces is provided, the method comprising: (a) comparing a threshold amplitude characteristic acceptance value for a time window of a reference trace to an amplitude characteristic of a test trace of a set of traces within the time window; and (b) applying a non-zero scalar to the test trace in the time window if the amplitude characteristic of the test trace within the time window is not within the threshold amplitude characteristic acceptance value, wherein the applying the non-zero scalar brings the amplitude of the test trace within the time window to be below the amplitude of the reference trace.

According to another aspect of the invention, a method of processing a set of seismic data traces is provided, wherein the method comprises: (a) comparing a threshold amplitude characteristic acceptance value for a time window of a reference trace to an amplitude characteristic of a test trace of a set of traces within the time window; and (b) applying a non-zero scalar to the test trace in the time window if the amplitude characteristic of the test trace within the time window is not within the threshold amplitude characteristic acceptance value, wherein the applying the non-zero scalar brings the amplitude of the test trace within the time window to be below the amplitude of the reference trace, wherein a set of modified data is defined; (c) storing the scalars, along with identifying information of the time window and trace to which the scalar applied; and (d) retrieving the original data from the modified data and the stored scalars.

Benefits of the invention include, in addition to addressing the problems mentioned above, reduction of low-amplitude noise a slight amount, while reducing high amplitude noise a larger amount. In applying such a method, the signal in the traces is preserved. Further, since the low amplitude noise is attenuated such a small amount, the threshold can be set very close to the expected signal level. Thus, time-sharing can be eliminated, or reduced significantly.

DESCRIPTION OF THE DRAWINGS

For a more complete understanding of the present invention and for further advantages thereof, reference is made to the following Detailed Description taken in conjunction with the accompanying drawings, in which:

FIG. 1 is a set of common offset traces including burst noise.

FIG. 2 is a modified set of the traces of FIG. 1, after an embodiment of the present invention has been applied.

FIG. 3 shows a plot of a raw shots with burst noise.

FIG. 4 shows the raw shots of FIG. 3 after application of an embodiment of the present invention.

FIG. 5 shows the difference section between FIGS. 3 and 4.

DETAILED DESCRIPTION

Referring now to FIG. 1, a set of common channel marine (and therefore common offset) traces 10 is seen, including reflections 12 of seismic reflectors (not shown) and a region of burst noise 14. Each trace 10 is taken from a different source location along the survey. It will be noted that the burst noise 14 occurs at different times along each trace. This location depends upon the location of the interfering source (in the case of noise from the source of another vessel), the water depth, water bottom reflection coefficients, and other parameters. However, according to the present invention, knowledge of such parameters is unneeded, as will be made apparent below.

The present invention operates in regions where the amplitude of reflections 12 is below that of interfering noise 14. Therefore, according to one embodiment of the invention, an amplitude characteristic of the noise 14 is used to detect the portion of the trace 10 in which the noise 14 exists. As used herein, "amplitude characteristic" refers to, for example, RMS amplitude, peak amplitude, rectified amplitude, nth root of the summation of all amplitudes raised to the nth power, or other characteristics which are amplitude-dependent. For example, another amplitude characteristic includes a ratio of the RMS value within a window of a trace to a reference RMS value, taken, for example, from a similar window on a reference trace. A non-zero scalar is applied to that portion to reduce the noise, without reducing all of the reflector signal that may have occurred in the trace at the same time. The result after application of the non-zero scalar to the trace of FIG. 1 is seen in FIG. 2. Since the noise does not appear in all of the trace, not every portion of the traces 10 should be scaled. Therefore, the portion of trace 10 including noise 14 must be identified.

According to one example identification process, a first time window W1 of a reference trace 10a is chosen for the data at particular depth D, and a threshold amplitude characteristic acceptance value Athres is chosen to be over the seismic reflection RMS amplitude characteristic and below the noise RMS amplitude characteristic. According to some embodiments, the seismic reflection amplitude characteristic for the window W1 is derived from averaging across a distance window Wd (not shown), corresponding to that portion of the common offset gather from about within a diameter and a half of the fresnel zone of the dominant frequency for a particular depth of interest. Such a limitation is an ideal, although if the averaging is performed across a distance Wd larger than such diameter, the process will work, although at an increasing risk of damaging actual reflection data. The goal of any limitation in the distance Wd over which the averaging is performed is to avoid averaging over regions of changing geology. On-site testing is recommended, whereby a common offset section is displayed, differenced both with and without the process of the invention, and a difference section is inspected to determine if any geologic structure appears in the difference section. In the event geology does appear, the process should be re-run, using a smaller distance window Wd between the traces for averaging.

In picking the reference trace, numerous alternative embodiments are acceptable. In one example, for each window, the mean amplitude characteristic trace is determined and used. In other examples, the median, alpha-trimmed mean, or alpha-trimmed median are used. It should also be noted that the time window can be defined as a number of samples in the digital environment and the units of time are used herein merely as a convenience.

Further, although the above process was described with respect to common offset gathers, common mid-point or common receiver gathers are also used, according to alternative embodiments of the invention. Common offset gathers do not perform well in cases of steep dip structure, where geology changes sharply, trace-to-trace. In such a case, the narrow windows (W1, W2, W3), which sample horizontally across the gather, will see the structure as an abnormally high amplitude in only a few traces. Accordingly, the threshold amplitude characteristic acceptance value will be set too low, and the signal will be attenuated. Using a domain in which the signals of interest appear in the same or about the same time window across the gather reduces this problem. The common mid-point domain places the structure closer to horizontal, especially after NMO is applied. However, the common mid-point domain is, necessarily, sensitive to inaccuracies in NMO. Accordingly, the common receiver domain, which is less sensitive to inaccuracies in NMO, is another useful domain. In the common receiver domain, there is more sample than in common offset, and, therefore, the signal is more likely to appear in enough traces for an accurate threshold value to be chosen.

In picking the threshold amplitude characteristic acceptance value Athres, it is desirable to make the choice as close as possible to the highest expected signal strength for a particular depth of interest. However, as with the process for picking the distance window Wd, it is also recommended that on-site testing be conducted. Again, the appropriate section is displayed, differenced both with and without the process of the invention, and a difference section is inspected to determine if any geologic structure appears. In the event geology does appear, the process should be re-run, using a higher Athres. In practice, a range of between about 120% and about 500% of the RMS amplitude characteristic of the window containing the expected reflection 12 has been found acceptable. In one particular experiment, a value of about 170% worked well. Further, although the RMS value of amplitude characteristic is used in the presently described example, it will be appreciated that peak values and other values related to the amplitude characteristic are also acceptable.

It should also be noted that the time window length is noise-dependent. It will be longer or shorter, depending on the characteristics of the particular noise. For example, according to some embodiments of the invention, the time window W1 is chosen to be within about 20% of the period of the dominant frequency of the expected noise. In deep water, for interference from other vessels, a window of about 50 msec has been found useful. In embodiments attempting to attenuate swell noise, which is relatively low frequency, a window of as much as 500 msec is effective. In some cases of interference and swell noise, the noise is in the characteristic of a train of impulses. In such cases, the time window used should be about the width of the train.

Also, it has been found that burst noise has a frequency spectrum that is different from that of the desired signal. Therefore, according to some embodiments of the invention, the amplitude characteristic Athres is used within the time window in a limited frequency band of between about 40 Hertz and about 200 Hertz. In other embodiments, a frequency bandwidth of between about 10 Hz and about 200 Hz is effective.

A sampling rate of the data, in some embodiments, of about 2 milliseconds has been found to be useful, again depending on the high frequency content of the seismic interference noise. Such fine sampling enables one to safely record high frequencies. An acceptable range for sampling of the data occurs between about 1 millisecond and about 4 milliseconds. It is also believed that sample rates above about 4 milliseconds would be effective in some circumstances, depending on the bandwidth of the noise.

Turning now to a further aspect of the invention, the threshold amplitude characteristic acceptance value Athres is compared to an amplitude characteristic of a test trace of a set of traces within the time window, and a non-zero scalar is applied to the test trace in the time window, if an amplitude characteristic of the test trace within the time window exceeds the threshold amplitude characteristic acceptance value. In applying the non-zero scalar, various methods are used. In one example, the scalar is applied evenly across the entire window. In others, the scalar is applied on a distribution centered on the RMS peak within the window. Other methods of applying the non-zero scalar will occur to those of skill in the art. More specific examples will be detailed below.

According to still a further embodiment, after the steps above have been performed, a modified set of traces is the result, and the same method is applied to the modified set of traces. It has been found that a two or more pass routine (i.e., a "cascaded routine") operates generally better than a single pass.

According to even a further embodiment, the process, whether single or cascaded, is applied along the entire trace with sliding windows. An overlap (between about 10% and about 80%) of the windows is used in some embodiments, but such an overlap is not necessary. In one example, an overlap of about 50% was found effective. In a further example, the overlap is as great as possible, with the window being moved only one sample along the trace at a time.

According to still further embodiments, the non-zero scalar is a multiplicative function of a ratio of the amplitude characteristic of the reference trace and the amplitude characteristic of the test trace in the time window. In one embodiment, the ratio is multiplied by a value less than one; while, in another embodiment, the ratio is raised to a positive power. In one experiment, a power of 4 was found to be useful.

According to even further embodiments, after the application of the scalar to the traces, further pre-stack processing of the traces is performed (e.g. NMO, DMO, zero-offset migration, and other filtering and deconvolution), although there is no particular order that must be followed. Afterward, the traces are stacked, and post-stack processing of the stacked traces is performed, as in the prior art, to result in a survey section for interpretation.

Referring now to FIG. 3, an example of a raw stack with burst noise is seen. After processing as described above, with a time window of 50 milliseconds at a 2 millisecond sample, across a full bandwidth with a threshold value of 170%, and raising the ratio detected below the threshold value of the reference value and the amplitude characteristic of the test trace in the first window to a power of 4, the raw stack of FIG. 5 is the result. A difference plot of FIG. 3 and FIG. 4 is seen in FIG. 5.

One specific system that has been found to be acceptable for use with various embodiments of the present invention is the PGS ENSBAL™ program, run on a PGS CUBE MANAGER™ platform on a massively parallel processor machine (e.g. an Intel 1860). In such a system, the ENSBAL™ program scans along a trace, reporting a correction factor (i.e. an amplitude characteristic) needed to make the RMS value of the trace within a window equal to a median RMS value within the same window of other traces, chosen from a group of nearby common offset traces from a distance window of about the fresnel-zone width. Note that the median RMS value for one window is not, necessarily, from the same trace as the median RMS value for another window. Next, if the scalar reported by ENSBAL™ program is below a threshold amount (i.e. an amplitude characteristic threshold acceptance value), then the correction factor is raised to a power, resulting in a correction scalar, which is applied to the test trace window.

In applying the scalar, it is desirable to avoid sharp changes. Step-wise changes in the scalar, sample-to-sample, should not be greater than about 30%, and, preferably, they should be less than about 10%. Therefore, according to one embodiment of the invention, a method of reducing noise from a set of seismic data traces is provided, comprising: (a) comparing a threshold amplitude characteristic acceptance value to an amplitude characteristic of a test trace of a set of traces within the time window; and (b) applying a non-zero scalar to the test trace in the time window if the amplitude characteristic of the test trace within the time window is not within the threshold amplitude characteristic acceptance value, wherein the applying the non-zero scalar brings the amplitude of the test trace within the time window to be below the amplitude of the reference trace. It should be noted that for the correction factor to be "within the threshold amplitude characteristic acceptance value," as that phrase is used herein, the correction factor must be greater than the threshold amplitude characteristic acceptance value, which in this embodiment is a ratio. In other embodiments, for example, those in which the threshold amplitude characteristic acceptance value is the RMS value of a window of a trace, the amplitude characteristic is "within the threshold amplitude characteristic acceptance value" if it is below the threshold amplitude characteristic acceptance value.

Returning now to an embodiment in which the amplitude characteristic comprises a correction factor, the applying is performed to multiple windows along the test trace and comprises: calculating a correction factor for each time window which, if applied to the test trace within the time window, would modify the test trace within the time window to match the amplitude characteristic of the test trace in the time window to the amplitude characteristic of a corresponding reference trace window; applying a unity correction scalar of about 1 where the correction factor is above the threshold amplitude characteristic acceptance value plus a constant, wherein a non-noise window is defined; raising the correction factor to a power where the correction factor is below the threshold amplitude characteristic acceptance value, wherein a non-unity correction scalar is defined and wherein a noise window is defined; calculating a first interpolation between the correction scalar applied in a window adjacent to the noise window and the non-unity correction scalar; applying, between adjacent noise windows, the first interpolation having non-unity correction scalars; applying, between noise windows adjacent non-noise windows, a second interpolation between 1 and the threshold amplitude characteristic acceptance value, for all points on the first interpolation between the threshold amplitude characteristic acceptance value plus a constant and the threshold amplitude characteristic acceptance value; and applying, between noise windows adjacent non-noise windows, the first interpolation between the threshold amplitude characteristic acceptance value and the non-unity correction scalar, for all points on the first interpolation between the threshold amplitude characteristic acceptance value and the non-unity correction scalar.

According to an alternative embodiment using a correction factor, the applying is performed to multiple windows along the test trace and comprises: calculating a correction factor for each time window which, if applied to the test trace within the time window, would modify the test trace within the time window to match the amplitude characteristic of the test trace in the time window to the amplitude characteristic of a corresponding reference trace window; applying a unity correction scalar of about 1 where the correction factor is above the threshold amplitude characteristic acceptance value plus a constant, wherein a non-noise window is defined; dividing the correction factor for a noise window by the threshold amplitude characteristic acceptance value, whereby a normalized correction factor is defined for the noise window; applying the normalized correction factor to the noise window; and applying an interpolation between the correction scalar applied in a window adjacent to the noise window and the non-unity correction scalar.

In one specific example, the Athres amplitude characteristic is chosen at a value of 0.7. For a non-noise gate, the scalar has a value of 1. In an adjacent noise gate, the scalar has a value of 0.3. In such a case, there is a linear interpolation between 1 and 0.3. Moving down the slope of the interpolation for each sample between the gates, if the interpolation is at least Athres plus a constant (e.g., 0.1) then the correction scalar is set to 1 and no correction is applied. However, for a position where the interpolation is between 0.8 and 0.7 (for the example where the constant is 0.1), the scalar is set to a value which is, itself, interpolated between 1 and 0.7. After the first interpolation reaches 0.7, the scalar is set to the first interpolation value. At a 500 msec gate difference, the above example values work quite well. In other embodiments, other distributions of application of the scalar, for example, Gaussian distribution, are also within the scope of the invention. Further, it should be noted that other interpolation schemes will also suffice.

In still a further embodiment, the non-zero scalars are stored, mapped with information corresponding to the specific window on the specific trace to which it was applied. The purpose of this storing is to allow for recovery of the data in an unmodified form, if desired, without the need to store a completely separate set of data. The mapped scalars also give an indication of just how much data was modified. Finally, in one embodiment, the correction factors are stored and mapped, which are used to determine an appropriate threshold amplitude characteristic acceptance value. For example, a plot of the distributions of all of the correction factors would show two distributions. A first distribution occurs around the signal level, and a second distribution occurs around the noise level. Between lies a region from which the threshold amplitude characteristic acceptance value is chosen.

In a still further embodiment, the threshold scalar is picked by analysis of the signal and noise levels of the set of traces in a bandwidth-limited basis, but the scalar is applied across the entire bandwidth of the windows. Examples of acceptable bandwidths for the analysis are, for seismic interference, between about 50 Hz and about 150 Hz, and, for swell noise, between about 5 Hz to about 40 Hz.

The above described embodiments are given by way of example only, and further embodiments will occur to those of skill in the art without departing from the spirit of the present invention.

What is claimed is:

1. A method of reducing noise in a set of seismic data traces comprising:
   (a) comparing a threshold amplitude characteristic acceptance value for a time window of a reference trace to an amplitude characteristic of a test trace of a set of traces within the time window; and
   (b) applying a non-zero scalar to the test trace in the time window if the amplitude characteristic of the test trace within the time window is not within the threshold amplitude characteristic acceptance value, wherein the applying the non-zero scalar brings the amplitude of the test trace within the time window to be below the amplitude of the reference trace and above zero, and wherein the non-zero scalar value varies in the time window.

2. A method as in claim 1 wherein the applying of the non-zero scalar is conducted evenly across the time window.

3. A method as in claim 1 wherein the applying is conducted on a distribution centered on the peak RMS value within the time window.

4. A method as in claim 1 wherein the set of traces comprise common offset traces.

5. A method as in claim 1 wherein the set of traces comprise common channel traces.

6. A method as in claim 1 wherein the set of traces comprise common mid-point traces.

7. A method as in claim 1 wherein the set of traces comprise common receiver point traces.

8. A method as in claim 1 wherein the threshold amplitude characteristic acceptance value is a function of average peak value within the time window of a reference trace.

9. A method as in claim 1 wherein the threshold amplitude characteristic acceptance value is a function of the RMS value of the time window of a reference trace.

10. A method as in claim 1 wherein the threshold amplitude characteristic acceptance value is a function of the rectified average value of the time window of a reference trace.

11. A method as in claim 1 wherein the threshold amplitude characteristic acceptance value is between about 120% and about 500% of the amplitude of the time window of a reference trace.

12. A method as in claim 1 wherein the threshold amplitude characteristic acceptance value is a function of the amplitude of the time window of a reference trace between about 10 and about 200 hertz.

13. A method as in claim 1 wherein the threshold amplitude characteristic acceptance value is a function of the amplitude of the time window of a reference trace between about 40 and about 200 hertz.

14. A method as in claim 1 wherein the time window of a reference trace is less than about 20% of the period of a dominant noise frequency.

15. A method as in claim 1 wherein the time window of a reference trace is less than about is about the length of a noise train.

16. A method as in claim 1 further comprising performing steps a–b along multiple time windows along the test trace.

17. A method as in claim 16 wherein the multiple windows overlap.

18. A method as in claim 17 wherein the multiple windows overlap by between about 20% and about 80%.

19. A method as in claim 16 further comprising:
   providing a modified set of traces based on the application of steps a–b to the first set of traces; and applying, at least one additional time, steps a–b to the modified set of traces.

20. A method as in claim 1 wherein the comparing comprises determining the difference in amplitude characteristic in the time window of the reference trace and in the test trace, wherein the amplitude characteristic within the time window of the reference trace is about the same as the mean of the amplitude characteristic of traces in the time window for the set of seismic data traces.

21. A method as in claim 20 wherein the comparing is conducted in a bandwidth of between about 50 Hz and about 150 Hz.

22. A method as in claim 20 wherein the comparing is conducted in a bandwidth of between about 5 Hz and about 40 Hz.

23. A method as in claim 1 wherein the comparing comprises determining the difference in amplitude characteristic in the time window of the reference trace and in the test trace, wherein the amplitude characteristic within the time window of the reference trace is about the same as the alpha-trimmed median of the amplitude characteristic of traces in the time window for the set of seismic data traces.

24. A method as in claim 23 wherein the comparing is conducted in a bandwidth of between about 50 Hz and about 150 Hz.

25. A method as in claim 23 wherein the comparing is conducted in a bandwidth of between about 5 Hz and about 40 Hz.

26. A method as in claim 1 wherein the comparing comprises determining the difference in amplitude characteristic in the time window of the reference trace and in the test trace, wherein the amplitude characteristic within the time window of the reference trace is about the same as the alpha-trimmed mean of the amplitude characteristic of traces in the time window for the set of seismic data traces.

27. A method as in claim 26 wherein the comparing is conducted in a bandwidth of between about 50 Hz and about 150 Hz.

28. A method as in claim 26 wherein the comparing is conducted in a bandwidth of between about 5 Hz and about 40 Hz.

29. A method as in claim 1 wherein the comparing comprises determining the difference in amplitude characteristic in the time window of the reference trace and in the test trace, wherein the amplitude characteristic within the time window of the reference trace is about the same as the median of the amplitude characteristic of traces in the time window for the set of seismic data traces.

30. A method as in claim 29 wherein the comparing is conducted in a bandwidth of between about 50 Hz and about 150 Hz.

31. A method as in claim 29 wherein the comparing is conducted in a bandwidth of between about 5 Hz and about 40 Hz.

32. A method as in claim 1 wherein the non-zero scalar consists essentially of a multiplicative function of a ratio of the amplitude characteristic of the reference trace in the time window and the amplitude characteristic of the test trace in the time window.

33. A method as in claim 1 wherein the non-zero scalar consists essentially of a function of a ratio of the amplitude characteristic of the reference trace in the time window and the amplitude characteristic of the test trace in the time window, wherein the ratio is raised to a power.

34. A method as in claim 33 wherein the set of traces comprise common offset traces across about one and one-half times the width of the fresnel zone of a dominant frequency.

35. A method as in claim 33 wherein the threshold amplitude characteristic is a function of RMS value of the time window of a reference trace.

36. A method as in claim 33 wherein the threshold amplitude characteristic acceptance value is between about 120% and about 500% RMS value of the time window of a reference trace.

37. A method as in claim 33 wherein the threshold amplitude characteristic is a function of the RMS value of the first time window of a reference trace between about 10 and about 200 Hz.

38. A method as in claim 33 wherein the threshold amplitude characteristic is a function of the RMS value of the first time window of a reference trace between about 40 and about 200 Hz.

39. A method as in claim 33 wherein the first time window of a reference trace is below about 20% of the period of a dominant noise frequency.

40. A method as in claim 33 further comprising performing steps a–b along multiple time windows along the test trace.

41. A method as in claim 40 wherein the multiple windows overlap.

42. A method as in claim 41 wherein the multiple windows overlap by between about 20% and about 80%.

43. A method as in claim 40 further comprising:
providing a modified set of traces based on the application of steps a–b to the first set of traces; and
applying, at least one additional time, steps a–b to the modified set of traces.

44. A method as in claim 1 wherein the non-zero scalar consists essentially of a power of a ratio between an equalizing scalar which, if applied, would make the amplitude characteristic within the time window of the test trace equal the amplitude characteristic of the reference trace within the time window, and the threshold amplitude characteristic value.

45. A method as in claim 1 further comprising:
providing a modified set of traces based on the application of steps a–b to the first set of traces; and
applying, at least one additional time, steps a–b to the modified set of traces.

46. A method as in claim 1 further comprising:
performing further pre-stack processing of the traces;
stacking the traces; and
performing post-stack processing of the stacked traces.

47. A method as in claim 1 wherein the applying is performed to multiple windows along the test trace and comprises:
calculating a correction factor for each time window which, if applied to the test trace within the time window, would modify the test trace within the time window to match the amplitude characteristic of the test trace in the time window to the amplitude characteristic of a corresponding reference trace window;
applying a unity correction scalar of about 1 where the correction factor is above the threshold amplitude characteristic acceptance value plus a constant, wherein a non-noise window is defined,
raising the correction factor to a power where the correction factor is below the threshold amplitude characteristic acceptance value, wherein a non-unity correction scalar is defined and wherein a noise window is defined;
calculating a first interpolation between the correction scalar applied in a window adjacent to the noise window and the non-unity correction scalar;

applying, between adjacent noise windows, the first interpolation having non-unity correction scalars;

applying, between noise windows adjacent non-noise windows, a second interpolation between 1 and the threshold amplitude characteristic acceptance value, for all points on the first interpolation between the threshold amplitude characteristic acceptance value plus a constant and the threshold amplitude characteristic acceptance value; and applying, between noise windows adjacent non-noise windows, the first interpolation between the threshold amplitude characteristic acceptance value and the non-unity correction scalar, for all points on the first interpolation between the threshold amplitude characteristic acceptance value an the non-unity correction scalar.

48. A method as in claim 1 wherein the applying is performed to multiple windows along the test trace and comprises:

calculating a correction factor for each time window which, if applied to the test trace within the time window, would modify the test trace within the time window to match the amplitude characteristic of the test trace in the time window to the amplitude characteristic of a corresponding reference trace window;

applying a unity correction scalar of about 1 where the correction factor is above the threshold amplitude characteristic acceptance value plus a constant, wherein a non-noise window is defined, dividing the correction factor for a noise window by the threshold amplitude characteristic acceptance value, whereby a normalized correction factor is defined for the noise window, applying the normalized correction factor to the noise window;

applying an interpolation between the correction scalar applied in a window adjacent to the noise window and the non-unity correction scalar.

49. A method as in claim 48 wherein, before the applying the normalized correction factor, the normalized correction factor is raised to a power.

50. A method as in claim 1 further comprising determining the threshold amplitude characteristic acceptance value to be between a statistical identification of a signal amplitude characteristic and a statistical identification of a noise characteristic.

51. A method as in claim 50 wherein the determining the threshold amplitude characteristic acceptance value comprises:

calculating a correction factor for each time window which, if applied to the test trace within the time window, would modify the test trace within the time window to match the amplitude characteristic of the test trace in the time window to the amplitude characteristic of a corresponding reference trace window;

detecting a signal-related distribution of the stored correction factors;

detecting a noise-related distribution of the stored correction factors; and assigning a threshold value to the threshold amplitude characteristic acceptance value between the signal distribution and the noise distribution.

52. A method of processing a set of seismic data traces comprising:

(a) comparing a threshold amplitude characteristic acceptance value for a time window of a reference trace to an amplitude characteristic of a test trace of a set of traces within the time window; and (b) applying a non-zero scalar to the test trace in the time window if the amplitude characteristic of the test trace within the time window is not within the threshold amplitude characteristic acceptance value, wherein the applying the non-zero scalar brings the amplitude of the test trace within the time window to be below the amplitude of the reference trace and above zero, and wherein the non-zero scalar value varies in the time window, wherein a set of modified data is defined;

(c) storing the scalars, along with identifying information of the time window and trace to which the scalar is applied; and (d) retrieving the original data from the modified data and the stored scalars.

* * * * *